(12) United States Patent
Green

(10) Patent No.: US 12,217,952 B2
(45) Date of Patent: Feb. 4, 2025

(54) MASS CORRECTION

(71) Applicant: Micromass UK Limited, Wilmslow (GB)

(72) Inventor: Martin Raymond Green, Bowdon (GB)

(73) Assignee: Micromass UK Limited, Wilmslow (GB)

(*) Notice: Subject to any disclaimer, the term of this patent is extended or adjusted under 35 U.S.C. 154(b) by 880 days.

(21) Appl. No.: 17/318,202

(22) Filed: May 12, 2021

(65) Prior Publication Data
US 2021/0265148 A1 Aug. 26, 2021

Related U.S. Application Data

(63) Continuation of application No. 14/990,928, filed on Jan. 8, 2016, now Pat. No. 11,031,217.

(30) Foreign Application Priority Data

Jan. 9, 2015 (GB) ..................... 1500377

(51) Int. Cl.
*H01J 49/00* (2006.01)
*G01N 30/86* (2006.01)

(52) U.S. Cl.
CPC .......... *H01J 49/0036* (2013.01); *G01N 30/86* (2013.01); *G01N 30/8679* (2013.01)

(58) Field of Classification Search
None
See application file for complete search history.

(56) References Cited

U.S. PATENT DOCUMENTS 6,915,227 B2 7/2005 Quimby et al.
7,880,136 B2 2/2011 Makarov et al.
(Continued)

FOREIGN PATENT DOCUMENTS

EP 3252798 A1 12/2017
GB 2383963 A 7/2003
(Continued)

OTHER PUBLICATIONS

Gustafsson et al. "Internal calibrants allow high accuracy peptide matching between MALDI imaging MS and LC-MS/MS." J. Proteomics. 75(2012):5093-5105.
(Continued)

*Primary Examiner* — Walter L Lindsay, Jr.
*Assistant Examiner* — Geoffrey T Evans
(74) *Attorney, Agent, or Firm* — WOMBLE BOND DICKINSON (US) LLP; Deborah M. Vernon; Mark R. DeLuca

(57) ABSTRACT

Disclosed is a method of mass spectrometry comprising the steps of: providing a library of matrix data, said matrix data comprising one or more physico-chemical properties of one or more matrix components as a function of retention time; chromatographically separating a sample, said sample containing at least some of said matrix components and one or more analyte components; analysing said sample at a plurality of retention times to obtain sample data, said sample data comprising one or more physico-chemical properties of one or more sample components as a function of retention time; and calculating one or more error values as a function of retention time based on a comparison between said sample data and said matrix data.

13 Claims, 2 Drawing Sheets

(56) References Cited

U.S. PATENT DOCUMENTS

| | | | |
|---|---|---|---|
| 9,418,824 | B2 | 8/2016 | Wildgoose |
| 2004/0043441 | A1 | 3/2004 | Dervieux et al. |
| 2004/0161819 | A1 | 8/2004 | Aharoni et al. |
| 2008/0067356 | A1 | 3/2008 | Goodley et al. |
| 2009/0090855 | A1 | 4/2009 | Kobold et al. |
| 2009/0179147 | A1 | 7/2009 | Milgram et al. |
| 2010/0163721 | A1 | 7/2010 | Graves et al. |
| 2011/0101215 | A1 | 5/2011 | Hirabayashi et al. |
| 2012/0318970 | A1 | 12/2012 | Quimby et al. |
| 2014/0012515 | A1 | 1/2014 | Taneda |
| 2014/0132607 | A1 | 5/2014 | Kawana |
| 2014/0260509 | A1 | 9/2014 | Pohl |
| 2014/0326871 | A1 | 11/2014 | Whitehouse et al. |
| 2015/0073727 | A1 | 3/2015 | Zubarev et al. |

FOREIGN PATENT DOCUMENTS

| | | |
|---|---|---|
| GB | 2536536 A | 9/2016 |
| WO | 2006110848 A2 | 10/2006 |
| WO | 2012131620 A1 | 10/2012 |

OTHER PUBLICATIONS

Norris et al. "Processing MALDI Mass Spectra to Improve Mass Spectra Direct Tissue Analysis." Int. J. Mass Spectrom. 260.2-3(2007):212-221.
Chiu et al., "Matrix Effects—A Challenge Toward Automation of Molecular Analysis", JALA, pp. 233-242, 2010.
Rubert et al., "Analysis of Mycotoxins in Barley Using Ultra High Liquid Chromatography High Resolution Mass Spectrometry: Comparison of Efficiency and Efficacy of Different Extraction Procedures", Talanta, vol. 99, pp. 712-719, 2012.
Zachariasova et al., "Analysis of Multiple Mycotoxins in Beer Employing (Ultra)-High-Resolution Mass Spectrometrv", Rapid Communications in Mass Spectrometry, vol. 24, No. 22, pp. 3357-3367, 2010.
Zrostlikova et al., "Alternative Calibration Approaches to Compensate the Effect of Co-Extracted Matrix Components in Liquid Chromatography—Electrospray lo11isatio11 Ta11dem Mass Spectrometry A11alysis of Pesticide Residues ill Pla11t Materials", Journal of Chromatography, vol. 973, No. 1-2, pp. 13-26, 2002.
US PTO Subject Matter Eligibility Webpage for 2019 and past guidance for 2015, 2016 and 2018 (Year: 2019).
"Oct. 2019 Patent Eligibility Guidance Update": pp. 1-11 (Year: 2019).
Definition of "analytical", Google.com (2019) (Year: 2019).
George Mason University, "Gas Chromatography-Mass Spectroscopy Background" (1998): pp. 1-4 (retrieved from https:// www.gmu.edu/depts/SRI F/tutorial/gcd/gc-ms2.htm) (Year: 1998).
Majors, Sample Preparation Fundamentals for Chromatography, Agilent Technologies, Canada, 2013: p. 1-353.
Keller et al. "Interferences and contaminants encountered in modern mass spectrometry." Anal. Chim. Acta. 627 (2008): 71-81.
Lee et al. "24-Hour Lock Mass Protection." J. Prot. Res. 10(2011): 880-885.
Lommen et al. "Ultra-fast searching assists in evaluating sub-ppm mass accuracy enhancement in U-HPLC/Orbitrap MS data." Metabolomics. 7(2011): 15-24.
Olsen et al. "Parts per Million Mass Accuracy on an Orbitrap Mass Spectrometer via Lock Mass Injection into a C-trap." Mol. Cell. Prot. 4.12(2005): 2010-2021.
Riklit Institute of Food Safety. 2011.
Scheltema et al. "Increasing the mass accuracy of high-resolution LC-MS data using background ions—a case study on the LTQ-Orbitrap." Prot. 8.22(2008): 4647-4656.
Scheltema et al. "Increasing the mass accuracy of high-resolution LC-MS data using background ions—a case study on the LTQ-Orbitrap." Prot. 8.22(2008): 4647-4656. Supporting Information Document.

MASS CORRECTION

CROSS-REFERENCE TO RELATED APPLICATIONS

This application claims benefit and priority to US application Ser. No. 14/99,0928 filed Jan. 8, 2016, which claims priority from and the benefit of United Kingdom patent application No. 1500377.5 filed on 9 Jan. 2015. The entire contents of these applications are incorporated herein by reference in their entirety.

FIELD OF THE INVENTION

The present invention relates generally to mass spectrometry and in particular to mass spectrometers and methods of mass spectrometry.

BACKGROUND

In many analyses small amounts of target or unknown analytes are analysed in the presence of a known well defined complex matrix. Chromatographic techniques such as liquid chromatography ("LC") and gas chromatography ("GC") coupled with mass spectrometry are routinely used to separate the analyte from the matrix components.

Biological matrices include plasma, urine, faeces and bile. In other application areas many other common matrices are present such as soil and various types of food e.g. orange, ginger and apple etc.

It is known to correct for mass to charge ratio drift in chromatography techniques. For example, continuous background ions such as characteristic solvent ions (or column bleed ions in the case of gas chromatography) which are generally low mass to charge ratio, sparse within the data and change non-chromatographically during the chromatographic run have been used to correct for mass to charge ratio drift.

As there are relatively few continuous background ions the probability of mass interference at points in the chromatogram due to matrix ions can be relatively high. This is also the case with internal reference compounds. Additionally, the statistical precision of these ions may reduce confidence in mass assignment. In some cases very high concentrations of matrix ions can suppress the signal from these background ions making correction impossible at certain points in the chromatogram.

Reference is made to "Analysis of mycotoxins in barley using ultra high liquid chromatography high resolution mass spectrometry: comparison of efficiency and efficacy of different extraction procedures", by Josep Rubert et al., Talanta, vol. 99, pp. 712-719, 20 Jul. 2012 ("Talanta").

GB2383963 (Agilent) discloses correcting the time axis of local chromatographic data in comparison to stored reference data.

US2014/0260509 (Pohl) discloses a method of calibrating a chromatography system.

It is desired to provide an improved method of mass analysing a sample using chromatographic techniques.

SUMMARY

According to an aspect of the present disclosure there is provided a method of mass spectrometry comprising:
providing a library of matrix data, the matrix data comprising one or more physico-chemical properties of one or more matrix components as a function of retention time;
chromatographically separating a sample, the sample containing at least some of the matrix components and one or more analyte components;
analysing the sample at a plurality of retention times to obtain sample data, the sample data comprising one or more physico-chemical properties of one or more sample components (e.g., including at least some of said matrix components) as a function of retention time;
calculating one or more error values as a function of retention time based on a comparison between the sample data and the matrix data.

This method improves error analysis by using the physico-chemical properties of matrix components to calculate error values as a function of retention time.

"Analysis of mycotoxins in barley using ultra high liquid chromatography high resolution mass spectrometry: comparison of efficiency and efficacy of different extraction procedures", by Josep Rubert et al., Talanta, vol. 99, pp. 712-719, 20 Jul. 2012 ("Talanta") describes a method in which a sample is separated by ultra-high pressure liquid chromatography and analysed in an Orbitrap (RTM) mass spectrometer. Talanta does not disclose or suggest using matrix components to create error values as a function of retention time.

GB2383963 (Agilent) discusses a method of correcting local chromatographic data, and does not disclose a method of mass spectrometry as described herein. Agilent is further distinct from the present disclosure in that it describes creating correction functions for retention time based on calibration compounds. In contrast, the present disclosure uses matrix components to create error values, wherein the matrix compounds may be contained in a sample comprising analyte components dispersed in a matrix.

US2014/0260509 (Pohl) describes using a standard solution to repeatedly calibrate a chromatography system, and does not disclose or suggest using matrix components to create error values as described herein.

Various embodiments disclosed herein can allow mass accuracy to be maintained without introducing additional internal or external lock mass ions. Reference is made to "Matrix Effects-A Challenge Toward Automation of Molecular Analysis" (Journal of Laboratory Automation, 2010, 15:233). This can significantly simplify the instrument operation and maximise time available for collecting analyte data. One problem with external lock mass is that the external lock mass approach may result in gaps in the data where lock mass is introduced. For very fast chromatography this can result in loss of data.

A plurality of samples may be provided, one of which may be the sample described above, and the plurality of samples may have a common matrix (e.g., urea, soil, apple etc.) components are substantially the same for all of the samples. The steps of analysing the sample and calculating one or more error values may be repeated for additional samples taken from the plurality of samples.

The sample(s) may comprise analyte components dispersed in a or the common matrix.

According to various embodiments the mass to charge ratio values of certain ions eluting from a chromatograph or chromatography system are optionally identified as being common, known or predetermined matrix ions. The identified common, known or predetermined matrix ions may then be used to calculate error values and/or adjust a mass calibration as a function of retention time. The error values and/or modified mass calibrations can then optionally be used to correct for mass to charge ratio drift during the analysis or a subsequent experimental run. Instead of mass to charge ratio, other physico-chemical properties could be used such as one or more of drift time, collision cross section ("CCS"), interaction cross section, ion mobility, differential ion mobility and retention time.

References to "a function of retention time" may be interpreted to mean that the values proposed are given with an associated retention time or retention time period. For example, an error value may be calculated for a period of time corresponding to a retention time period, or for a single value of retention time. The correction applied may be to mass spectra that are produced within the retention time period. Alternatively, the mass spectra within a retention time period may be summed and the correction applied to the summed mass spectrum.

The step of providing a library of matrix data may comprise chromatographically separating a sample or matrix comprising the matrix components, for example in one or more initial chromatographic separations, and optionally analysing the sample or matrix at one or more retention times to obtain the matrix data. The initial chromatographic separation may not be analytical and/or may not form part of an analytical run. The step of providing a library of matrix data may be performed prior to the step of separating and analysing said sample to obtain the sample data.

The sample data may be obtained during one or more analytical runs.

The step of calculating one or more error values may comprise determining a difference between a physico-chemical property in the sample data and a corresponding physico-chemical property in the matrix data at a particular retention time or retention time region. The physico-chemical property may relate to the same matrix component. For example, the matrix may be urine and the matrix component may be uric acid. The physico-chemical property may be the mass to charge ratio of the uric acid.

The comparison may be a comparison of one or more physico-chemical properties of one or more matrix components in the matrix data with the same physico-chemical properties of the same matrix components in the sample data.

The matrix data may comprise one or more physico-chemical properties of a plurality of different matrix components as a function of retention time, and the step of calculating one or more error values may comprise calculating a plurality of error values as a function of retention time, wherein each error value is optionally in respect of a different matrix component.

The matrix data may comprise one or more physico-chemical properties of at least 2, 4, 8, 16, 32, 64 or 128 different matrix components as a function of retention time, and the step of calculating one or more error values may comprise calculating at least 2, 4, 8, 16, 32, 64 or 128 respective error values as a function of retention time, wherein each error value is optionally in respect of a different matrix component.

The method according to various embodiments optionally further comprises calculating one or more adjustment or correction values based on the one or more error value. The one or more adjustment or correction values may be associated with a respective retention time, mass, mass to charge ratio or other physico-chemical property.

The step of calculating one or more adjustment or correction values may comprise plotting or calculating a plurality of error values as a function of retention time, and optionally determining the adjustment or correction values from the plot.

The step of calculating an adjustment or correction value may comprise plotting or determining a plurality of error values as a function of retention time and determining the adjustment or correction values from a line of fit associated with the plot or determination of error values as a function of retention time.

Each error, adjustment or correction value may be recorded with a corresponding retention time and/or physico-chemical property, for example mass, mass to charge ratio, drift time, collision cross section ("CCS"), interaction cross section, ion mobility or differential ion mobility.

The method according to various embodiments may further comprise adjusting or correcting mass spectral data, for example mass to charge ratio values, associated with the sample using the one or more adjustment or correction values. The adjusting or correcting mass spectral data may comprise identifying a mass spectra at a given retention time, calculating an adjustment or correction value at the retention time as described above, and applying this adjustment or correction value to the mass spectra. The adjustment or correction value may comprise ppm error or correspond to a shift value for the spectrum.

It will be appreciated that the adjustment or correction of mass spectral data or mass to charge ratio values is distinct from prior art methods that correct or adjust retention times. The error, adjustment or correction values may be calculated by identifying, for a given retention time, one or more mass to charge ratio peaks in the sample data that correspond to matrix peaks, and comparing the respective values associated with those peaks (e.g., intensity, mass to charge ratio) to the values that are stored in the library for those particular matrix peaks, and calculating the error, adjustment or correction value from the difference between the sample and the library values. Typically, a number of matrix peaks will be identified for a particular retention time or retention time period, and the error, adjustment or correction value at a particular retention time or retention time period may be calculated from a plurality of matrix peaks (e.g., at least 2, 4, 8, 16, 32, 64 or 128), for example an average value could be used.

The method according to various embodiments may further comprise adjusting or correcting one or more instrument parameters using the adjustment or correction value.

The one or more instrument parameters may comprise one or more of detector gain, transmission efficiency, ionisation efficiency, time of flight voltage and reflectron voltage.

The step of adjusting or correcting may be performed in real time or as a post-processing technique.

The error values may be used to modify or amend a calibration or calibration model. For example, the difference between the physico-chemical property of the matrix component in the sample data and the physico-chemical property of the matrix component in the matrix data may be used to modify or amend a calibration or calibration model. The calibration model may be amended as a function of retention time, that is the modification or amendment may be applied to the calibration or calibration model as a function of retention time. The calibration or calibration model may be amended at each retention time or retention time period.

Any of the physico-chemical properties described herein may comprise one or more of mass, mass to charge ratio, drift time, collision cross section ("CCS"), interaction cross section, ion mobility, differential ion mobility and retention time.

Any of the physico-chemical properties described herein may be or comprise intensity or abundance.

The method may further comprise determining one or more matrix components. The step of determining one or more matrix components may be carried out separately to, for example prior to or after, the step of chromatographically separating and analysing said sample.

The error value and/or plurality of error values and/or adjustment or correction value may be used to correct mass spectral data relating to said analyte components. The known or determined matrix components may be used as a lock mass for the analyte components.

The sample may be analysed using a mass spectrometer, and the method may further comprise introducing a reference or lock mass component into said mass spectrometer during an experimental run if the one or more error values exceed a defined limit. The reference may comprise an internal or external standard. The reference or lock mass may be introduced into the mass spectrometer with or separately to said sample. The reference or lock mass component may interrupt the flow or introduction of said sample into said mass spectrometer.

The method may further comprise introducing a reference or lock mass component into a or the mass spectrometer during an experimental run if said one or more error values exceed a defined limit.

The method may further comprise mixing the matrix components and the analyte components to form said sample prior to mixing said sample with a solvent. The method may further comprise mixing the matrix components and the analyte components to form said sample prior to separating said sample.

According to an aspect of the present disclosure there is provided a mass spectrometer comprising:
  a chromatography system arranged and adapted to chromatographically separate a sample and to analyse the sample at one or more retention times to obtain sample data, the sample data comprising one or more physico-chemical properties of one or more sample components as a function of retention time; and
  a control system arranged and adapted:
  (i) to provide a library of matrix data, the matrix data comprising one or more physico-chemical properties of one or more matrix components as a function of retention time;
  (iii) to calculate one or more error values as a function of retention time based on a comparison between the sample data and the matrix data.

According to an aspect of the present disclosure there is provided a method of mass spectrometry comprising the steps of:
  providing a library of matrix data, the matrix data comprising one or more physico-chemical properties of one or more matrix components;
  imaging a sample at a plurality of spatial locations, the sample containing at least some of the matrix components and one or more analyte components;
  analysing the sample at the plurality of spatial locations to obtain sample data, the sample data comprising one or more physico-chemical properties of one or more sample components;
  calculating one or more error values based on a comparison between the sample data and the matrix data, wherein each error value is associated with a given spatial location.

The comparison may be a comparison of one or more physico-chemical properties of one or more matrix components in the matrix data with the same physico-chemical properties of the same matrix components in the sample data.

According to an aspect of the present disclosure there is provided a mass spectrometer comprising:
  a control system arranged and adapted:
  to provide a library of matrix data, the matrix data comprising one or more physico-chemical properties of one or more matrix components; wherein the mass spectrometer further comprises:
  an ion imaging system arranged and adapted:
  to image a sample at a plurality of spatial locations, the sample containing at least some of the matrix components and one or more analyte components; and
  to analyse the sample at one or more spatial locations to obtain sample data, the sample data comprising one or more physico-chemical properties of one or more sample components; wherein the control system is further arranged and adapted:
  to calculate one or more error values based on a comparison between the sample data and the matrix data, wherein each error value is associated with a given spatial location.

According to an aspect of the present disclosure there is provided a method of mass spectrometry comprising:
  chromatographically separating a sample containing a mixture comprising analyte and matrix compounds;
  recording at least one of mass, mass to charge ratio, ion mobility and drift time data during the chromatographic elution time;
  processing the data to determine at least one of mass, mass to charge ratio, ion mobility and drift time properties of each ion species; and
  identifying one or more ion species at one or more different retention times and/or mass to charge ratio values by comparison with a library of ion species associated with the said properties, wherein
  the ion species in the library are restricted to those matrix ions which are known to be, or are highly likely to be in the mixture, and
  the identified ion species originates from chromatographic elution of at least some of the compounds within the mixture;
  the method further comprising:
  determining at least one of a mass, mass to charge ratio, ion mobility and drift time error between the identified species and the library values;
  calculating at least one of a mass, mass to charge ratio, ion mobility and drift time correction value as a function of retention time or retention time region; and
  adjusting at least one of a mass, mass to charge ratio, ion mobility and drift time calibration as a function of retention time or retention time region for the ion species in the data based on said function.

The spectrometer may comprise an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; and (xxix) Surface Assisted Laser Desorption Ionisation ("SALDI").

The spectrometer may comprise one or more continuous or pulsed ion sources.

The spectrometer may comprise one or more ion guides.

The spectrometer may comprise one or more ion mobility separation devices and/or one or more Field Asymmetric Ion Mobility Spectrometer devices.

The spectrometer may comprise one or more ion traps or one or more ion trapping regions.

The spectrometer may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The spectrometer may comprise a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

The spectrometer may comprise one or more energy analysers or electrostatic energy analysers.

The spectrometer may comprise one or more ion detectors.

The spectrometer may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The spectrometer may comprise a device or ion gate for pulsing ions; and/or a device for converting a substantially continuous ion beam into a pulsed ion beam.

The spectrometer may comprise a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser.

The spectrometer may comprise a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

The spectrometer may comprise a device arranged and adapted to supply an AC or RF voltage to the electrodes. The AC or RF voltage optionally has an amplitude selected from the group consisting of: (i) about <50 V peak to peak; (ii) about 50-100 V peak to peak; (iii) about 100-150 V peak to peak; (iv) about 150-200 V peak to peak; (v) about 200-250 V peak to peak; (vi) about 250-300 V peak to peak; (vii) about 300-350 V peak to peak; (viii) about 350-400 V peak to peak; (ix) about 400-450 V peak to peak; (x) about 450-500 V peak to peak; and (xi)>about 500 V peak to peak.

The AC or RF voltage may have a frequency selected from the group consisting of: (i)<about 100 kHz; (ii) about 100-200 kHz; (iii) about 200-300 kHz; (iv) about 300-400 kHz; (v) about 400-500 kHz; (vi) about 0.5-1.0 MHz; (vii) about 1.0-1.5 MHz; (viii) about 1.5-2.0 MHz; (ix) about 2.0-2.5 MHz; (x) about 2.5-3.0 MHz; (xi) about 3.0-3.5 MHz; (xii) about 3.5-4.0 MHz; (xiii) about 4.0-4.5 MHz; (xiv) about 4.5-5.0 MHz; (xv) about 5.0-5.5 MHz; (xvi) about 5.5-6.0 MHz; (xvii) about 6.0-6.5 MHz; (xviii) about 6.5-7.0 MHz; (xix) about 7.0-7.5 MHz; (xx) about 7.5-8.0

MHz; (xxi) about 8.0-8.5 MHz; (xxii) about 8.5-9.0 MHz; (xxiii) about 9.0-9.5 MHz; (xxiv) about 9.5-10.0 MHz; and (xxv)>about 10.0 MHz.

The spectrometer may comprise a chromatography or other separation device upstream of an ion source. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide may be maintained at a pressure selected from the group consisting of: (i)<about 0.0001 mbar; (ii) about 0.0001-0.001 mbar; (iii) about 0.001-0.01 mbar; (iv) about 0.01-0.1 mbar; (v) about 0.1-1 mbar; (vi) about 1-10 mbar; (vii) about 10-100 mbar; (viii) about 100-1000 mbar; and (ix)>about 1000 mbar.

Analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device.

Optionally, in order to effect Electron Transfer Dissociation either: (a) analyte ions are fragmented or are induced to dissociate and form product or fragment ions upon interacting with reagent ions; and/or (b) electrons are transferred from one or more reagent anions or negatively charged ions to one or more multiply charged analyte cations or positively charged ions whereupon at least some of the multiply charged analyte cations or positively charged ions are induced to dissociate and form product or fragment ions; and/or (c) analyte ions are fragmented or are induced to dissociate and form product or fragment ions upon interacting with neutral reagent gas molecules or atoms or a non-ionic reagent gas; and/or (d) electrons are transferred from one or more neutral, non-ionic or uncharged basic gases or vapours to one or more multiply charged analyte cations or positively charged ions whereupon at least some of the multiply charged analyte cations or positively charged ions are induced to dissociate and form product or fragment ions; and/or (e) electrons are transferred from one or more neutral, non-ionic or uncharged superbase reagent gases or vapours to one or more multiply charged analyte cations or positively charged ions whereupon at least some of the multiply charge analyte cations or positively charged ions are induced to dissociate and form product or fragment ions; and/or (f) electrons are transferred from one or more neutral, non-ionic or uncharged alkali metal gases or vapours to one or more multiply charged analyte cations or positively charged ions whereupon at least some of the multiply charged analyte cations or positively charged ions are induced to dissociate and form product or fragment ions; and/or (g) electrons are transferred from one or more neutral, non-ionic or uncharged gases, vapours or atoms to one or more multiply charged analyte cations or positively charged ions whereupon at least some of the multiply charged analyte cations or positively charged ions are induced to dissociate and form product or fragment ions, wherein the one or more neutral, non-ionic or uncharged gases, vapours or atoms are selected from the group consisting of: (i) sodium vapour or atoms; (ii) lithium vapour or atoms; (iii) potassium vapour or atoms; (iv) rubidium vapour or atoms; (v) caesium vapour or atoms; (vi) francium vapour or atoms; (vii) $C_{60}$ vapour or atoms; and (viii) magnesium vapour or atoms.

The multiply charged analyte cations or positively charged ions may comprise peptides, polypeptides, proteins or biomolecules.

Optionally, in order to effect Electron Transfer Dissociation: (a) the reagent anions or negatively charged ions are derived from a polyaromatic hydrocarbon or a substituted polyaromatic hydrocarbon; and/or (b) the reagent anions or negatively charged ions are derived from the group consisting of: (i) anthracene; (ii) 9,10 diphenyl-anthracene; (iii) naphthalene; (iv) fluorine; (v) phenanthrene; (vi) pyrene; (vii) fluoranthene; (viii) chrysene; (ix) triphenylene; (x) perylene; (xi) acridine; (xii) 2,2' dipyridyl; (xiii) 2,2' biquinoline; (xiv) 9-anthracenecarbonitrile; (xv) dibenzothiophene; (xvi) 1,10'-phenanthroline; (xvii) 9' anthracenecarbonitrile; and (xviii) anthraquinone; and/or (c) the reagent ions or negatively charged ions comprise azobenzene anions or azobenzene radical anions.

The process of Electron Transfer Dissociation fragmentation may comprise interacting analyte ions with reagent ions, wherein the reagent ions comprise dicyanobenzene, 4-nitrotoluene or azulene.

A chromatography detector may be provided, wherein the chromatography detector comprises either:

a destructive chromatography detector optionally selected from the group consisting of (i) a Flame Ionization Detector (FID); (ii) an aerosol-based detector or Nano Quantity Analyte Detector (NQAD); (iii) a Flame Photometric Detector (FPD); (iv) an Atomic-Emission Detector (AED); (v) a Nitrogen Phosphorus Detector (NPD); and (vi) an Evaporative Light Scattering Detector (ELSD); or a non-destructive chromatography detector optionally selected from the group consisting of: (i) a fixed or variable wavelength UV detector; (ii) a Thermal Conductivity Detector (TCD); (iii) a fluorescence detector; (iv) an Electron Capture Detector (ECD); (v) a conductivity monitor; (vi) a Photoionization Detector (PID); (vii) a Refractive Index Detector (RID); (viii) a radio flow detector; and (ix) a chiral detector.

The spectrometer may be operated in various modes of operation including a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation a Quantification mode of operation or an Ion Mobility Spectrometry ("IMS") mode of operation.

BRIEF DESCRIPTION OF THE DRAWINGS

Various embodiments of the present disclosure will now be described, by way of example only, and with reference to the accompanying drawings in which.

DETAILED DESCRIPTION

Figure 1:
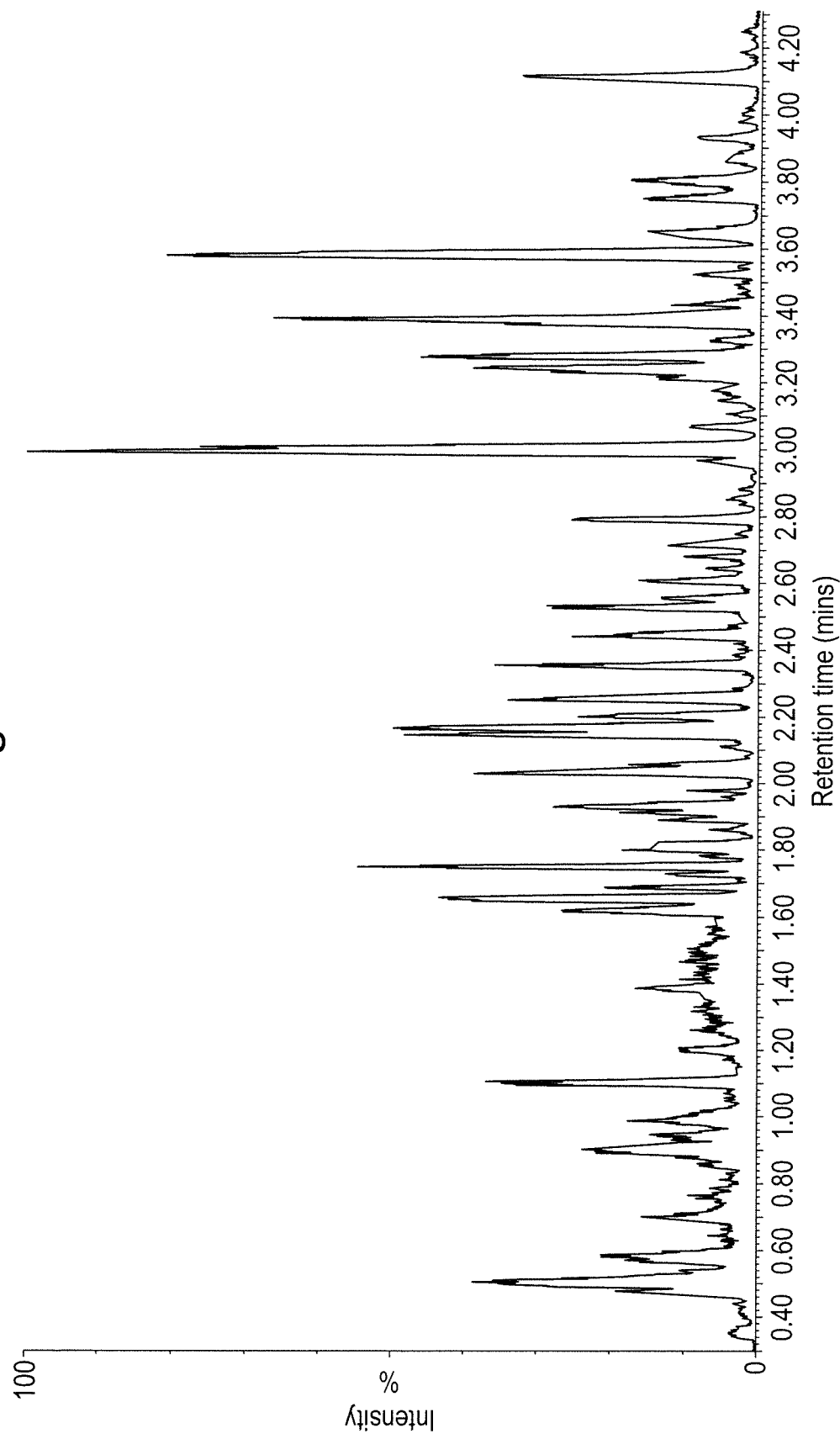
FIG. 1 shows a chromatogram of a sample of human urine.

A method of mass spectrometry is disclosed and may begin with the step of providing a library of matrix data. The matrix data comprises one or more physico-chemical properties of one or more matrix components as a function of retention time, such as the mass to charge ratios of a number of matrix peaks. A sample, which could be taken from a number of samples having the same origin (e.g., urine samples from a plurality of people, soil samples from a particular area), is chromatographically separated. The sample contains at least some of said matrix components and one or more analyte components. For example, the sample may be urine and the matrix component(s) may be urea, uric acid, etc., while the analyte component(s) may be traces of certain drugs.

The sample is analysed at a plurality of retention times to obtain sample data, wherein the sample data comprises one or more physico-chemical properties of one or more sample components as a function of retention time. The sample components may comprise or correspond to one or more matrix components, for example the same matrix components that are used to provide the library of matrix data.

One or more error values may be calculated as a function of retention time based on a comparison between said sample data and said matrix data. The comparison may comprise comparing a physico-chemical property of the one or more matrix components in the sample data with the corresponding physico-chemical property of the same matrix components in the matrix data, at one or more retention times. The one or more error values may correspond to the difference between the physico-chemical property of the matrix component in the sample data and the physico-chemical property of the matrix component in the matrix data, at the one or more retention times.

Matrix components or compounds may be defined as the components of a mixture other than analyte(s). For a given origin of sample the presence of common or known matrix ions may be highly predictable. The matrix may be a biological matrix, for example plasma, urine, faeces or bile.

A matrix may be known before analysis begins and in many cases matrix matched standards have been prepared. A matrix, for example plasma, urine, faeces, bile, soil or a particular food may contain many endogenous compounds which will give rise to many highly reproducible chromatographic peaks over the retention time range in which analytes of interest elute. The composition of each type of matrix is substantially constant regardless of the origin of the sample. Various embodiments take advantage of this by using the endogenous compounds of the matrix, which elute at various retention times in an analysis run, to correct for errors in a sample containing such compounds as a function of retention time.

It should be appreciated that the composition of the matrix may be known beforehand, in the sense that it has a standard chromatographic elution profile that can be provided by reference to a known library.

However, the library of matrix data, including the physico-chemical properties of the matrix components, can alternatively be provided by chromatographically separating a sample containing the matrix components in an initial run, prior to the analytical run of the sample, so as to determine the physico-chemical properties of the matrix components as a function of retention time.

In this manner, it is not necessary that the matrix itself, or the matrix components can be identified, as long as the library of matrix data includes physico-chemical properties as a function of retention time. For example, the matrix and/or the matrix components may be unknown throughout the analysis. What is important is how the physico-chemical property of the matrix (whatever it may be) changes throughout the analytical run, as this is what is used to calculate the error values.

The approach according to various embodiments optionally removes the requirement for an internal or external lock mass or ion mobility lock drift to be provided and also optionally reduces experimental and instrument complexity.

FIG. 1 shows a base peak chromatogram of a sample of human urine acquired by liquid chromatography-Time of Flight mass spectrometry. The chromatogram is dominated by many intense peaks which give rise to mass spectra at each retention time. Many of these peaks relate to matrix ions and are of little or no analytical interest.

These matrix ions may be in different concentrations in samples from different species or individuals but a large enough proportion or subset of these compounds will be present in sufficient concentration in every sample of urine such that they may be regarded as characteristic of this matrix.

It should be noted that it may not be necessary to fully characterize these matrix ions in terms of elucidation of elemental composition, exact mass etc. in order to use these matrix ions to perform internal calibration of all the mass spectral peaks in the analysis.

Firstly, a plurality of samples may be provided and the chromatographic profile and/or mass, mass to charge ratio or ion mobility spectra of the plurality of samples may be recorded in an initial or non-analytical run. The system may have been calibrated with reference standards prior to analysis. The samples may comprise analyte components of interest dispersed in a matrix, wherein the matrix may be common to all of the samples and may contain endogenous matrix components or compounds.

For example, the samples may be a plurality of samples of urine. Amongst other things, the common endogenous compounds found in a urine matrix may include urea, creatinine, uric acid, citrate, host/pathogen DNA, host/pathogen RNA, amino acids, immunoglobulin, tamm-horsfall protein, albumin and many more compounds. These compounds may be common to all of the samples, and may have the same physico-chemical properties regardless of the particular sample taken.

Alternatively, the samples may be taken from one or more apples, in which case the matrix would be e.g. endogenous sugars in the apple and the method may comprise detecting levels of a particular analyte, for example a pesticide. The samples may all contain common, endogenous matrix components that have the same physico-chemical properties regardless of the particular sample taken. These could be used as the matrix components of the method disclosed herein.

Secondly, the data may be processed to produce a library of components and a determination may be made regarding which components are common to the matrix, regardless of its origin. A library of mass, mass to charge ratio, ion mobility, differential ion mobility, drift time, collision cross section ("CCS"), interaction cross section and/or retention time may be constructed for the matrix components.

A two dimensional peak detection algorithm such as APEX3D or 4D may be used to reduce each chromatographic feature to mass, mass to charge ratio, ion mobility, drift time, collision cross section ("CCS"), interaction cross section and/or retention time.

A sample may be run several times, or different samples may be run and analysed to improve the confidence in the library entries for the matrix components.

Certain samples may be well-known and the first and second steps provided above may not be required. For example, a library of matrix data comprising one or more physico-chemical properties of one or more matrix components as a function of retention time may be provided by reference to a known database.

Alternatively, for matrix peaks with unknown composition the expected physico-chemical property values associated within the library may be initially determined using conventional internal or external lock mass approaches known in the prior art.

The expected mass to charge ratio values for matrix peaks with known elemental composition may be calculated directly. Similarly, if the ion mobility, collision cross section ("CCS") or interaction cross section value for a matrix ion is known this may be recorded in the library directly. Alternatively, internal or external lock mobility approaches may be used to ensure accurate library entries.

Care must be taken to avoid matrix peaks which may have mass interference or are statistically imprecise. The presence of possible interference may be examined for example by comparison of peak shape or width to a model or expected peak shape or width. If a peak contains interference it may be rejected and not added to the library.

The statistical precision of mass and/or mobility measurement may be recorded with each measurement and optionally used to weight the contribution of particular signals to the final calibration applied.

Thirdly, further samples may then be analysed in subsequent or analytical runs. The data is optionally post processed to locate and record the physico-chemical properties (e.g., mass to charge ratio values) of the matrix peaks in the library which may be matched to corresponding matrix peaks in the subsequent or analytical samples. As many matrix peaks as possible should optionally be located. Signals which are very weak or which have mass interference are optionally avoided. Not all peaks in the library may be located or used for a particular analysis. Peaks may be located using one or more of mass, mass to charge ratio, ion mobility, differential ion mobility, drift time, collision cross section ("CCS"), interaction cross section or retention time.

Fourthly, one or more error values as a function of retention time may be calculated based on a comparison between the physico-chemical properties of the one or more matrix components in the sample data with the corresponding physico-chemical properties of the same matrix components in the matrix data, at one or more retention times.

For example, a graph may be created or otherwise calculated that plots (or calculates) error values, for example mass or mass to charge ratio error values, as a function of retention time for the matrix ions in one or more of the mass spectra created in the subsequent or analytical runs. In the case of ion mobility spectrometry, for example, the error values may be a percentage error of collision cross section. Most spectra will contain at least one matrix ion matched to the library. The errors calculated for each matched peak at each retention time may be averaged to a single value and assigned with an appropriate statistical error or processed separately.

Fifthly, an error function may be produced from the error values as a function of retention time. For example, a line of fit may be plotted through the graph or otherwise calculated, or a function corresponding to a line of fit may be calculated. Outliers may be ignored and statistical precision may be accounted for. The maximum curvature may be limited based on the gradual short term drift expected from the system. Methods of determining a best fit to such data and recognising outliers are known.

It will be appreciated that the error values being plotted as a function of retention time is due to retention time being the timescale of chromatographic separation.

Figure 2:
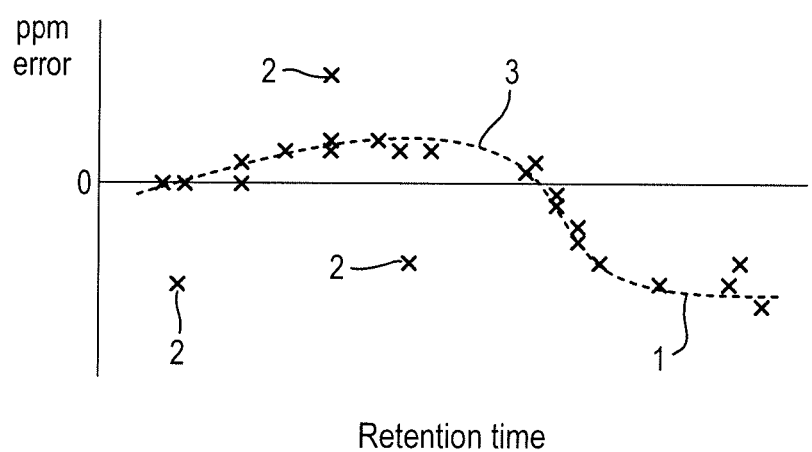
FIG. 2 shows a graph illustrating error as a function of retention time.

FIG. 2 shows a representation of a line of fit 1 for a plot of error as a function of retention time. The illustrated line of fit 1 represents the mass to charge ratio error in parts-per-million (ppm) of the peaks in the sample which match entries in the library as a function of retention time. The line of fit 1 may be a line of best fit.

Three outliers 2 are shown which have been determined not to fit the data trend and so have been excluded from the calculation of the line of fit 1. The outliers 2 may fall off the general trend line due to interference or mass assignment. The shape of the curve optionally represents the way the mass assignment has drifted during the course of the experimental retention time. This is known as mass to charge ratio drift and can occur, for example, due to the effect of ambient temperature changes during the experimental time. For a given system the maximum rate of change of mass to charge ratio, and hence the maximum curvature of this line, may be known or calculated. This may be used to restrain the curve and as a basis to reject outliers.

Fitting a smooth curve through all of the data may inherently smooth out statistical variations and closely model the expected behaviour of the system. It may also allow a region 3 of the chromatogram where no or few matrix ions are matched to the library to be corrected, based, for example, on the general trends observed before and or after these regions.

Alternatively, each spectrum or an averaged region of spectra may be corrected independently. Other methods of processing error (e.g., ppm) versus time data may be used such as calculating a moving average of the error with time.

Sixthly, the mass to charge ratio of one or more analyte peaks at their respective retention times may be corrected based on the error function, for example using the line of best fit to calculate an error value at the retention time of the analyte peak.

If $MS^E$ or scheduled or data dependent MS-MS experiments are performed, the library may contain precursor and fragment ions from the matrix. This can add to the number of peaks at each retention time which may be used for mass correction, and may improve the confidence of assignment of matrix ions in the sample to the entries in the library. Correction values calculated from the MS and MS-MS data at each retention time may be pooled or averaged to improve the accuracy.

In another embodiment correction may be calculated and applied during the chromatographic elution in real time, optionally based on identified matrix peaks. For example, real time correction of a current spectrum may use a moving average of correction values, optionally calculated from identified matrix ions in a number of previously acquired spectra.

Other instrument parameters may be monitored (e.g. mass resolution) in order to monitor instrument performance or apply real time correction or tuning adjustment.

Using real time monitoring of matrix ion mass to charge ratio values it is then possible to identify mass shifts caused by detector saturation in Time of Flight mass spectrometers, space charge aberrations in analytical RF or electrostatic ion traps or drift time shifts in ion mobility spectrometer or separator devices. This information may be used in real time to adjust instrument parameters e.g. one or more of ion transmission, ionisation efficiency, detector gain or ion trap fill time in order to compensate for these effects.

Alternatively, this information may be used in post processing to determine a correction to be applied to an analyte signal in order to compensate for shifts or other aberrations due e.g. to space charge effects at a particular retention time.

Mobility may be included and the disclosed methods may be used to correct for mobility drift or lock drift. The collision cross section ("CCS"), interaction cross section or drift time may be used as confirmation of the identity of a matrix peak to improve the library assignment.

In the case of proteomics many samples may be known to contain commonly found proteins such as keratin or ubiquitin. Peptides from these proteins may be used to correct drift during the separation. In the case of proteomics the database may be a protein/peptide database containing precursor and fragment ions.

In embodiments a known matrix or calibrant may be added, spiked or otherwise introduced into a sample of analyte such that known chromatographic peaks with known mass to charge ratios appear within the final data. The added matrix or calibrant mixture may be designed such that it does not elute at the same time as the analyte of interest, and therefore may not give rise to ionization suppression effects, interference or mass interference. In addition, the added matrix or calibrant may be designed such that it is separated from the analyte in mass to charge ratio or drift time space, optionally reducing the possibility of mass interference.

For example, when analysing protein digests a known digest of a protein or other type of mixture of compounds may be spiked into the sample to act as a lock mass during the chromatographic elution of the analyte peptides.

In small molecule quantification C13 labelled isotopes are often used with the analyte as internal quantification standards. These have the same retention time as the analyte but different known mass to charge ratio value. These may be used to correct for mass drift during the chromatographic elution.

Multi point lock mass may also be performed. In this case higher than first order lock mass correction may be applied. This may be used to correct for time offset drift from electronic timing circuits in time of flight systems. In the limit a mass calibration curve may be constructed for each retention time or retention time range, optionally by the method described and applied to the data.

According to an embodiment the method may be used in combination with a standard internal or external lock mass e.g. as a quality control check to make sure that the instrument calibration and or lock mass is correct.

Alternatively, the method may be used in combination with an external lock mass so that the drift in matrix ion mass to charge ratio may be monitored and used for internal correction and optionally to determine when to introduce an external lock mass during the chromatographic run. For example, correction up to 5 ppm may be allowed using the method described. Once the drift is determined to be outside this value then an external lock mass correction may be performed. This may reduce the number of external lock mass events to a minimum and may allow the frequency of lock mass introduction to be matched to the environmental conditions, optionally via the measured drift in the mass to charge ratio of the matrix ions.

Various embodiments may also remove the requirement for an internal or external lock mass or ion mobility lock drift, reducing experimental and instrument complexity.

The method may be applied to ion imaging, for example Matrix Assisted Laser Desorption/Ionisation ("MALDI") or Desorption Electrospray Ionisation ("DESI") tissue imaging, optionally using an orthogonal acceleration Time of Flight instrument.

In many imaging experiments, for example MALDI or DESI imaging, the origin of sample to be imaged may be well known. For example, the sample may be liver, muscle or other tissue from a known species. A library containing one or more physico-chemical properties of matrix components may be produced, wherein the matrix components correspond to common, reproducible compounds found in the sample.

Many matrix compounds or components may be found, which compounds or components may be substantially common over specific regions of, or over the whole surface of a particular sample. These compounds or components may be used to build an accurate library of matrix data to use in the disclosed method. In the case of animal tissue, for example, the matrix ions may arise from lipids, small proteins, or peptides.

The method may include providing a library of matrix data, the matrix data comprising one or more physico-chemical properties of one or more matrix components. The library containing the physico-chemical properties of one or more matrix compounds or components may be produced by analysing several tissue samples of similar type. This library may contain no spatial information.

The method may include imaging a sample at a plurality of spatial locations, the sample containing at least some of said matrix components and one or more analyte components. The method may include analysing said sample at said plurality of spatial locations to obtain sample data, said sample data comprising one or more physico-chemical properties of one or more sample components (including at least some of said matrix components).

When the sample is imaged in one or more analytical runs, an array of mass spectra, each associated with a given spatial location or range of spatial locations, may be produced. The time or time period at which each mass spectrum is produced may also be recorded along with the spatial information.

One or more matrix compounds or components may be identified in the mass spectrum or spectra obtained during the analytical run(s). One or more physico-chemical properties of the matrix compound(s) or component(s) in the sample data may be recorded or determined. The physico-chemical properties may include one or more of mass to charge ratio, drift time, collision cross section ("CCS"), interaction cross section, ion mobility and differential ion mobility.

Error values may be determined or calculated by comparing the physico-chemical properties of the matrix components in the library (i.e. the matrix data) to the physico-chemical properties of the same matrix components in the (analytical) sample data. A time value or time period may be associated with each error value by determining the time or times at which the mass spectra or mass spectrum containing the respective matrix component was recorded. Thus, the error values can be recorded as a function of time, and hence associated with a given spatial location or range of spatial locations.

The analyte data (i.e. not corresponding to matrix) that was acquired at each spatial location can then be corrected based on the error values. For example, a plot of the error values as a function of time (and therefore spatial location) may be produced, and one or more adjustment or correction values may be determined from the plot. For example, a function corresponding to a line of best fit of the plot of error values may be determined, and the one or more adjustment or correction values may be determined from the function corresponding to the line of best fit.

The analyte data (e.g., mass spectra or spectrum) may therefore be corrected at each spatial location, or range of spatial locations. It will be appreciated that the data that is corrected may be mass to charge ratio values in the mass spectra or spectrum.

Any or all of the mass spectra obtained during the analytical run may be corrected or adjusted by determining the times at which, or time period within which, each mass spectrum was recorded, determining an adjustment or correction factor at each time or time period (using the function) and applying each adjustment or correction factor to the mass spectrum obtained at its respective time or time period.

In some cases the sample may be inhomogeneous. For example a section of an entire animal may be imaged. In this case optical imaging may be used to locate the spatial coordinates containing known general tissue types (liver, heart, brain etc.).

When the library of matrix data is constructed the matrix components detected may be associated with a particular region of the image corresponding to a known tissue type. This is analogous to associating a measured matrix value to a particular retention time in the embodiments described above.

In some cases certain matrix components will only be associated with particular regions of the sample. This information may be used to direct matching of matrix ions observed in subsequent (analytical) sample data. For example, the physico-chemical properties of matrix components in the library may be recorded with an associated location or sample region (e.g., liver, heart, brain, etc.).

When carrying out the analytical run, the identification of the matrix components or compounds in the mass spectra (i.e. sample data) may include restricting the matrix data to those matrix components or compounds that correspond to the same location or sample region as the mass spectra. This can reduce the possibility, for example, of the same matrix component being used but with an incorrect physico-chemical property.

The matrix components used in the comparison between the sample data and the matrix data may be restricted to those matrix components or compounds that correspond to the same location or sample region as the mass spectra.

This approach may be extended to other analysis employing imaging or other surface sampling techniques. It is known, for example, in MALDI that eluent from a chromatographic separation may be deposited spatially onto a target strip creating an image of the chromatographic separation. Again matrix ions may be used to apply drift correction by the methods described above.

Samples for MALDI or DESI etc. may be individually deposited in specific locations on a target plate and subsequently analysed. Again the time at which each location of the target plate is analysed may be recorded as described above, allowing drift to be corrected at each target plate location using correlation between the matrix library and the sample.

Many other surface analysis or ion imaging techniques are known. For example, the above-described methods may be used in Direct Analysis in Real Time ("DART"), Matrix Assisted Inlet Ionisation ("MAIV"), Liquid Micro-Junction Surface Sampling ("LJM-SSP"), Liquid Extraction Surface Analysis ("LESA"), Low Temperature Plasma ("LTP"), Flowing Atmospheric Pressure Afterglow ("FAPA"), or Laser Ablation Electrospray Ionisation ("LAESI").

Although the present disclosure has been described with reference to various embodiments, it will be understood by those skilled in the art that various changes in form and detail may be made without departing from the scope of the disclosure as set forth in the accompanying claims.

The invention claimed is:

1. A method of mass spectrometry comprising the steps of:
    providing a library of matrix data, said matrix data comprising one or more physico-chemical properties of one or more matrix components;
    ion imaging a sample at a plurality of spatial locations, said sample containing at least some of said matrix components and one or more analyte components;
    mass analyzing ions from said sample at said plurality of spatial locations to obtain sample data comprising one or more physico-chemical properties of one or more sample components;
    calculating one or more error values based on a comparison between said sample data and said matrix data, wherein each error value is associated with a given spatial location; and
    adjusting or correcting one or more instrument parameters using adjustment or correction values, and wherein said one or more instrument parameters comprises one or more of detector gain, transmission efficiency, ionization efficiency, time of flight voltage and reflection voltage.

2. The method of mass spectrometry as claimed in claim 1, wherein said comparison is a comparison of one or more physico-chemical properties of one or more matrix components in the matrix data with the same physico-chemical properties of the same matrix components in the sample data.

3. The method of mass spectrometry as claimed in claim 1, wherein said matrix components of said sample correspond to components of said sample other than said analyte components.

4. The method of mass spectrometry as claimed in claim 1, wherein said matrix components correspond to common compounds of the sample that give rise to reproducible data associated with a given spatial region of the plurality of spatial locations.

5. The method of mass spectrometry as claimed in claim 4, comprising optically imaging said sample to locate a particular region corresponding to a known sample type, wherein providing a library of matrix data comprises associating said one or more matrix components with said particular region corresponding to a known sample type.

6. The method of mass spectrometry as claimed in claim 1, comprising recording a time value or period at which said sample data is obtained, wherein said one or more error values is associated with said time value or period.

7. The method of mass spectrometry as claimed in claim 1, further comprising calculating one or more adjustment or correction values of one or more physico-chemical properties associated with a given spatial location based on said one or more error values; and adjusting analyte data associated with a given spatial location in said sample data using the one or more adjustment or correction values.

8. The method of mass spectrometry as claimed in claim 7, wherein analyzing said sample at said plurality of spatial locations to obtain sample data is performed during one or more analytical runs of said sample, and wherein said step of adjusting analyte data associated with a given spatial location in said sample data is performed during a subsequent experimental run of the sample.

9. The method of mass spectrometry as claimed in claim 1, wherein any of said physico-chemical properties comprises one or more of mass, mass to charge ratio, drift time, collision cross section ("CCS"), interaction cross section, ion mobility and differential ion mobility.

10. The method of mass spectrometry as claimed in claim 1, wherein said ion imaging comprises ionizing said sample using an ionization technique selected from: Matrix Assisted Laser Desorption/Ionization ("MALDI"); Desorption Electrospray Ionization ("DESI") imaging; Direct Analysis in Real Time ("DART"); Matrix Assisted Inlet Ionization ("MAIV"); Liquid Micro-Junction Surface Sampling ("LJM-SSP"); Liquid Extraction Surface Analysis ("LESA"); Low Temperature Plasma ("LTP"); Flowing Atmospheric Pressure Afterglow ("FAPA"); and Laser Ablation Electrospray Ionization ("LAESI").

11. A mass spectrometer comprising:
a control system arranged and adapted:
to provide a library of matrix data, said matrix data comprising one or more physico-chemical properties of one or more matrix components; wherein said mass spectrometer further comprises:
an ion imaging system arranged and adapted:
to image a sample at a plurality of spatial locations, said sample containing at least some of said matrix components and one or more analyte components; and
to analyze said sample at one or more spatial locations to obtain sample data, said sample data comprising one or more physico-chemical properties of one or more sample components; wherein said control system is further arranged and adapted:
to calculate one or more error values based on a comparison between said sample data and said matrix data, wherein each error value is associated with a given spatial location; and
to adjust or correct one or more instrument parameters using adjustment or correction values, and wherein said one or more instrument parameters comprises one or more of detector gain, transmission efficiency, ionization efficiency, time of flight voltage and reflection voltage.

12. A mass spectrometer comprising:
a control system arranged and adapted:
to provide a library of matrix data, said matrix data comprising one or more physico-chemical properties of one or more matrix components;
an ion imaging system arranged and adapted:
to image a sample at a plurality of spatial locations, said sample containing at least some of said matrix components and one or more analyte components; and
to mass analyze ions from said sample at one or more spatial locations to obtain sample data, said sample data comprising one or more physico-chemical properties of one or more sample components;
wherein said control system is further arranged and adapted:
to calculate one or more error values based on a comparison between said sample data and said matrix data, wherein each error value is associated with a given spatial location; and
to calculate one or more adjustment or correction values of the one or more physico-chemical properties in the mass spectral data that is associated with said given spatial location based on said one or more error values; and
to adjust mass spectral data in said sample data that is associated with said given spatial location using the one or more adjustment or correction values.

13. A method of mass spectrometry comprising the steps of:
optically imaging a sample to locate a particular region corresponding to a known sample type;
providing a library of matrix data comprising one or more physico-chemical properties of one or more matrix components, wherein providing the library of matrix data comprises associating said one or more matrix components with said particular region;
ion imaging the sample at a plurality of spatial locations, said sample containing at least some of said matrix components and one or more analyte components;
mass analyzing ions from said sample at said plurality of spatial locations to obtain sample data comprising one or more physico-chemical properties of one or more sample components; and
calculating one or more error values based on a comparison between said sample data and said matrix data, wherein each error value is associated with a given spatial location.

* * * * *